US011827179B2

(12) United States Patent
Oman (10) Patent No.: US 11,827,179 B2
(45) Date of Patent: Nov. 28, 2023

(54) GESTURE RECOGNITION SYSTEM FOR HANDS-FREE VEHICLE ACCESS USING ULTRA-WIDEBAND COMMUNICATION

(71) Applicant: APTIV TECHNOLOGIES LIMITED, St. Michael (BB)

(72) Inventor: Todd P. Oman, Greentown, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 81 days.

(21) Appl. No.: 17/163,821

(22) Filed: Feb. 1, 2021

(65) Prior Publication Data

US 2022/0242370 A1    Aug. 4, 2022

(51) Int. Cl.
*B60R 25/25* (2013.01)
*H04W 4/029* (2018.01)
*B60R 25/01* (2013.01)
*B60R 25/24* (2013.01)

(52) U.S. Cl.
CPC .............. *B60R 25/25* (2013.01); *B60R 25/01* (2013.01); *B60R 25/241* (2013.01); *H04W 4/029* (2018.02); *B60R 2325/205* (2013.01)

(58) Field of Classification Search
CPC . B60R 2325/205; B60R 25/01; B60R 25/241; B60R 25/25; H04W 4/029
See application file for complete search history.

(56) References Cited

U.S. PATENT DOCUMENTS

| 8,930,045 | B2 | 1/2015 | Oman et al. | |
|---|---|---|---|---|
| 10,311,661 | B2* | 6/2019 | Menard | H04W 4/80 |
| 11,212,642 | B2* | 12/2021 | Ledvina | H04W 4/023 |
| 2006/0220806 | A1* | 10/2006 | Nguyen | B60R 25/102 |
| | | | | 340/426.36 |
| 2016/0236654 | A1 | 8/2016 | Dietzel et al. | |
| 2018/0065545 | A1* | 3/2018 | McMahon | B60Q 1/50 |
| 2020/0198580 | A1* | 6/2020 | Saleh | B60R 25/241 |

(Continued)

OTHER PUBLICATIONS

2017 Hands-Free liftgate issue—Nissan Pathfinder Forum, dated Sep. 18, 2016, https://www.pathfindertalk.com/threads/2017-hands-free-liftgate-issue.25834/, downloaded Dec. 4, 2020, 6 pages.

(Continued)

*Primary Examiner* — Nader Bolourchi
(74) *Attorney, Agent, or Firm* — Miller Johnson (57) ABSTRACT

A gesture recognition system for hands-free access to a vehicle includes a set of vehicle ultra-wideband (UWB) transceivers comprising at least three UWB transceivers and a controller configured to detect a presence of a vehicle-authorized mobile device in possession of an authorized user, determine a set of defined zones proximate to the vehicle and associated with hands-free vehicle access, communicate between the set of vehicle UWB transceivers and a device UWB transceiver of the mobile device to monitor a location of the mobile device, monitor a movement routine of the mobile device relative to the set of defined zones over a period, and in response to determining a match with one of a set of predefined movement routines associated with hands-free vehicle access, command one of a set of access actuators of the vehicle to grant hands-free vehicle access corresponding to the matched predefined movement routine.

20 Claims, 3 Drawing Sheets

(56) References Cited

U.S. PATENT DOCUMENTS

2021/0179020 A1* 6/2021 Hasegawa ............ B60R 25/245
2021/0402955 A1* 12/2021 Ahmed ................ B60R 25/245
2022/0247854 A1* 8/2022 Oman .................... H04W 4/80

OTHER PUBLICATIONS

Hands-Free tailgate issues—Ford Explorer—Ford Ranger Forums—Serious Explorations, dated Dec. 1, 2015, https://www.explorerforum.com/forums/threads/hands-free-tailgate-issues.437833/, downloaded Dec. 4, 2020, 10 pages.

NXP—Design with US, "Ultra-Wideband (UWB) Ranging and Sensing Technology Explained—YouTube," dated Jun. 13, 2019, https://www.youtube.com/watch?v=6Y8rgUD7DL4&ab_channel=NXP-Designwithus, downloaded Jan. 19, 2021, 2 pages.

NXP Semiconductors, "Ultra-Wideband (UWB) Smart Car Access Explained by Continental and NXP—YouTube," dated Jan. 8, 2020, https://www.youtube.com/watch?v=NFThn66G7BQ&ab_channel=NXPSemiconductors, downloaded Jan. 19, 2021, 4 pages.

NXP Semiconductors, "VW with NXP Show the Power of UWB for Future Cars—YouTube," dated Oct. 1, 2019, https://www.youtube.com/watch?v=9XiPCJEIEKo, downloaded Jan. 19, 2021, 2 pages.

NXP Semiconductors, "Welcome to NXP Connects 2020—Opening Keynote—YouTube," dated Oct. 20, 2020, https://www.youtube.com/watch?v=9KO9ppgydrg&ab_channel=NXPSemiconductors, downloaded Jan. 19, 2021, 2 pages.

NXP Semiconductors, "You and UWB—Discover Ultra-Wideband Use Cases with NXP—YouTube," dated Dec. 18, 2019, https://www.youtube.com/watch?v=sYLI3CTmYAE&ab_channel=NXPSemiconductors, downloaded Jan. 19, 2021, 2 pages.

* cited by examiner

GESTURE RECOGNITION SYSTEM FOR HANDS-FREE VEHICLE ACCESS USING ULTRA-WIDEBAND COMMUNICATION

FIELD

The present application generally relates to ultra-wideband (UWB) communication and, more particularly, to gesture recognition system for hands-free vehicle access using UWB communication.

BACKGROUND

Hands-free vehicle access typically involves an authorized user being proximate to or making a gesture to be granted access to the vehicle without using his/her hands to physically open a door/hatch. The authorization could be, for example, a key fob being in possession of the user. One common example of hands-free vehicle access is hands-free tailgate access. This can be particularly useful, for example, when the user's arms are full of belongings. One conventional hands-free tailgate access system requires the user to make a gesture with their foot beneath a rear bumper of the vehicle. This typically involves using a capacitive, ultrasonic, or short-range radar sensing system that is configured to sense the user's foot. Different sized/shaped feet, different types of shoe material, and environmental conditions (rain, snow, etc.) could have a negative impact on the sensitivity of such conventional hands-free tailgate access systems. In addition, the user could potentially fall while standing on one foot to perform the foot gesture or the user could initiate hands-free access to the vehicle causing the tailgate to open before he/she is fully prepared, which could result in the tailgate inadvertently contacting the user. Thus, while these conventional systems do work for their intended purpose, there exists an opportunity for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a gesture recognition system for hands-free access to a vehicle is presented. In one exemplary implementation, the system comprises a set of vehicle ultra-wideband (UWB) transceivers comprising at least three UWB transceivers each arranged proximate to at least one of sides and corners of the vehicle and a controller in communication with the set of vehicle UWB transceivers and configured to detect a presence of a vehicle-authorized mobile device in possession of an authorized user, wherein the mobile device comprises a device UWB transceiver, determine a set of defined zones proximate to the vehicle and associated with hands-free vehicle access, communicate between the set of vehicle UWB transceivers and the device UWB transceiver to monitor a location of the mobile device, monitor a movement routine of the mobile device relative to the set of defined zones over a period, and in response to determining a match between the monitored movement routine and one of a set of predefined movement routines associated with hands-free vehicle access, command one of a set of access actuators of the vehicle to grant hands-free vehicle access corresponding to the matched predefined movement routine.

In some implementations, the predefined movement routines are predetermined for the vehicle. In some implementations, the predefined movement routines are customizable by the user via the mobile device or another computing device. In some implementations, the user is able to customize at least one of size and shapes of the set of defined zones and durations that the mobile device must remain in particular defined zones. In some implementations, the controller is further configured to command an output actuator of the vehicle to output an indication to the user indicative of whether a particular portion of a particular predefined movement routine has been satisfied. In some implementations, the set of access actuators comprises at least one of a door actuator, a trunk actuator, and a rear tailgate or liftgate actuator.

In some implementations, a particular one of the set of predefined movement routines for hands-free access to a trunk/tailgate/liftgate of the vehicle comprises the mobile device moving to a first defined zone proximate to a rear of the vehicle but where the user would not obstruct movement of the trunk/tailgate/liftgate, the mobile device remaining in the first defined zone for at least a first period, the mobile device then moving to a second defined zone at the rear of the vehicle and where the user would obstruct movement of the trunk/tailgate/liftgate, the mobile device remaining in the second defined zone for at least a second period, and the mobile device then moving back to the first defined zone and remains in the first defined zone for at least a third period. In some implementations, the first, second, and third periods are substantially equal and are all less than a timeout period. In some implementations, if the mobile device remains in the first or second defined zones for greater than the timeout period, the controller determines that the monitored movement routine of the mobile device does not match the particular one of the set of predefined movement routines.

According to another aspect of the present disclosure, a gesture recognition method for hands-free access to a vehicle is presented. In one exemplary implementation, the method comprises detecting, by a controller of the vehicle, a presence of a vehicle-authorized mobile device in possession of an authorized user, wherein the mobile device comprises a device UWB transceiver, determining, by the controller, a set of defined zones proximate to the vehicle and associated with hands-free vehicle access, communicating, by the controller, between (i) a set of vehicle UWB transceivers of the vehicle comprising at least three UWB transceivers each arranged proximate to at least one of sides and corners of the vehicle and (ii) the device UWB transceiver to monitor a location of the mobile device, monitoring, by the controller, a movement routine of the mobile device relative to the set of defined zones over a period, and in response to determining a match between the monitored movement routine and one of a set of predefined movement routines associated with hands-free vehicle access, commanding, by the controller, one of a set of access actuators of the vehicle to grant hands-free vehicle access corresponding to the matched predefined movement routine.

In some implementations, the predefined movement routines are predetermined for the vehicle. In some implementations, the predefined movement routines are customizable by the user via the mobile device or another computing device. In some implementations, the user is able to customize at least one of size and shapes of the set of defined zones and durations that the mobile device must remain in particular defined zones. In some implementations, the method further comprises commanding, by the controller, an output actuator of the vehicle to output an indication to the user indicative of whether a particular portion of a particular predefined movement routine has been satisfied. In some implementations, the set of access actuators comprises at least one of a door actuator, a trunk actuator, and a rear tailgate or liftgate actuator.

In some implementations, a particular one of the set of predefined movement routines for hands-free access to a trunk/tailgate/liftgate of the vehicle comprises the mobile device moving to a first defined zone proximate to a rear of the vehicle but where the user would not obstruct movement of the trunk/tailgate/liftgate, the mobile device remaining in the first defined zone for at least a first period, the mobile device then moving to a second defined zone at the rear of the vehicle and where the user would obstruct movement of the trunk/tailgate/liftgate, the mobile device remaining in the second defined zone for at least a second period, and the mobile device then moving back to the first defined zone and remains in the first defined zone for at least a third period. In some implementations, the first, second, and third periods are substantially equal and are all less than a timeout period. In some implementations, if the mobile device remains in the first or second defined zones for greater than the timeout period, the controller determines that the monitored movement routine of the mobile device does not match the particular one of the set of predefined movement routines.

According to another aspect of the present disclosure, a gesture recognition system for hands-free access to a vehicle is presented. In one exemplary implementation, the system comprises a set of vehicle UWB transceiver means comprising at least three UWB transceiver means each arranged proximate to at least one of sides and corners of the vehicle and a controller means for communicating with the set of vehicle UWB transceiver means and for detecting a presence of a vehicle-authorized mobile device means in possession of an authorized user, wherein the mobile device comprises a device UWB transceiver means, determining a set of defined zones proximate to the vehicle and associated with hands-free vehicle access, communicating between the set of vehicle UWB transceiver means and the device UWB transceiver means to monitor a location of the mobile device means, monitoring a movement routine of the mobile device means relative to the set of defined zones over a period, and in response to determining a match between the monitored movement routine and one of a set of predefined movement routines associated with hands-free vehicle access, commanding one of a set of access actuator means of the vehicle for granting hands-free vehicle access corresponding to the matched predefined movement routine.

In some implementations, a particular one of the set of predefined movement routines for hands-free access to a trunk/tailgate/liftgate of the vehicle comprises the mobile device means moving to a first defined zone proximate to a rear of the vehicle but where the user would not obstruct movement of the trunk/tailgate/liftgate, the mobile device means remaining in the first defined zone for at least a first period, the mobile device means then moving to a second defined zone at the rear of the vehicle and where the user would obstruct movement of the trunk/tailgate/liftgate, the mobile device means remaining in the second defined zone for at least a second period, and the mobile device means then moving back to the first defined zone and remains in the first defined zone for at least a third period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As discussed above, conventional capacitive, ultrasonic, and short-range radar sensing systems for hands-free vehicle access have significant drawbacks. Accordingly, improved gesture recognition systems and methods for hands-free vehicle access are presented. These systems and methods utilize at least three ultra-wideband (UWB) transceivers arranged proximate to at least one of sides and corners of the vehicle. For example only, the vehicle could include four UWB transceivers arranged proximate to four corners of the vehicle. A controller of the vehicle is configured to detect a presence of a vehicle-authorized mobile device in possession of an authorized user, where the mobile device also comprises a device UWB transceiver. The controller also determines a set of defined zones proximate to the vehicle and associated with hands-free vehicle access. The controller then, using the set of vehicle UWB transceivers and the device UWB transceiver, monitors a location of the mobile device to monitor a movement routine of the mobile device relative to the set of defined zones over a period. In response to determining a match between the monitored movement routine and one of a set of predefined movement routines associated with hands-free vehicle access, command one of a set of access actuators of the vehicle to grant hands-free vehicle access corresponding to the matched predefined movement routine.

Figure 1:
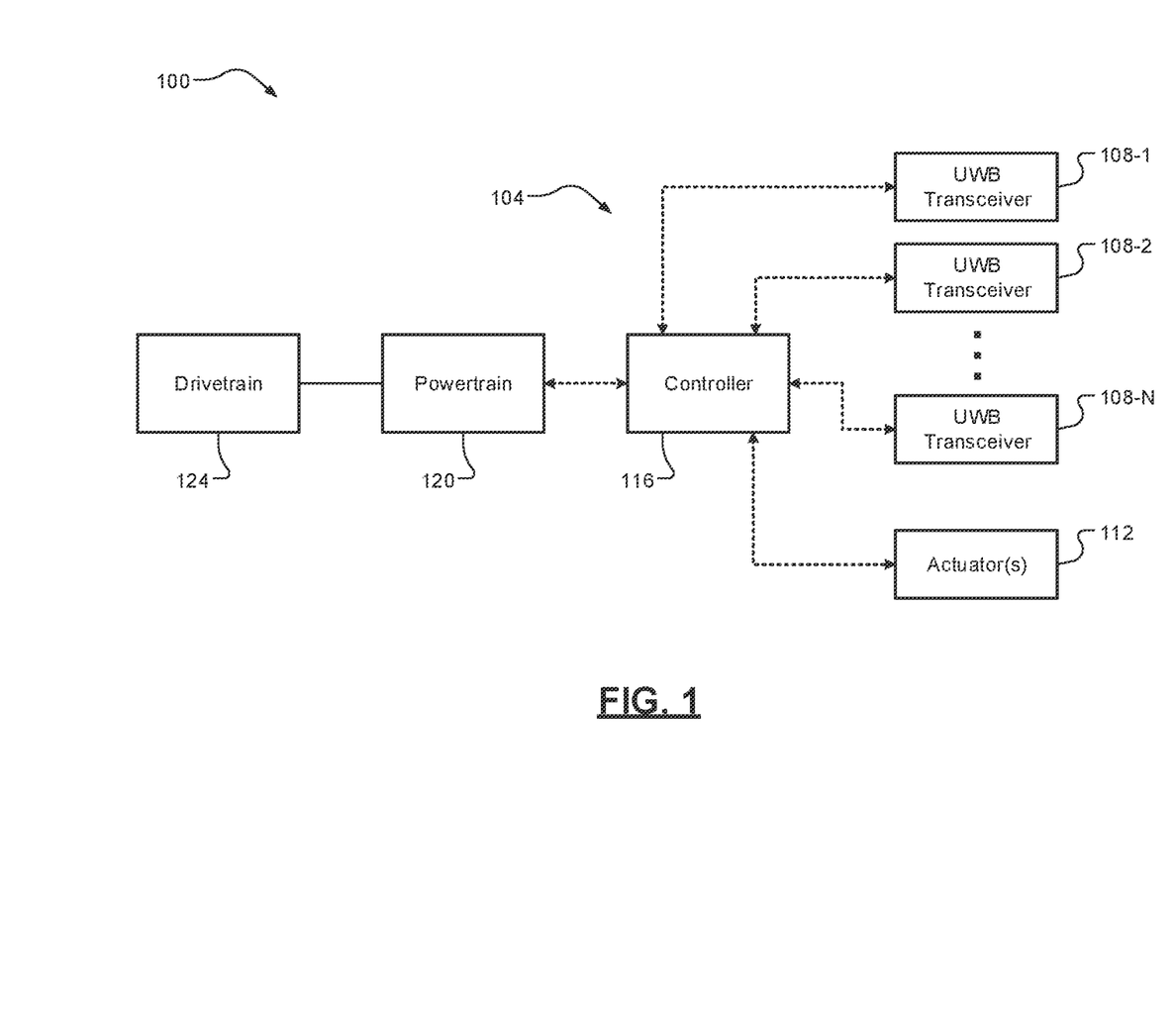
FIG. 1 is a functional block diagram of an example vehicle communication system comprising a set of at least three ultra-wideband (UWB) transceivers according to some implementations of the present disclosure.

Referring now to FIG. 1, a functional block diagram of a vehicle 100 having an example communication system 104 comprising a set of at least three UWB transceivers 108-1 . . . 108-N (N≥3; collectively, "UWB transceivers 108") according to some implementations of the present disclosure is illustrated. Each UWB transceiver 108 is configured for low-energy, short-range, high-bandwidth radio communication and the UWB transceivers 108 collectively provide for very precise location accuracy (e.g., within ~10 centimeters) via time-of flight (ToF) or time-difference-of-arrival (TDoA) positioning techniques. The vehicle 100 also includes a set of actuators 112 for providing hands-free access to the vehicle 100. This could include, for example only, an actuator for opening a door or a trunk or rear tailgate or liftgate of the vehicle 100. A controller 116 is in communication with the UWB transceivers 108 and the actuator(s) 112. The vehicle 100 further comprises other typical vehicle components, such as a powertrain 120 for generating and transferring drive torque to a driveline 124 of the vehicle 100 for propulsion. The controller 116 is configured to implement at least a portion of the techniques of the present disclosure, which will now be described in greater detail.

Figure 2:
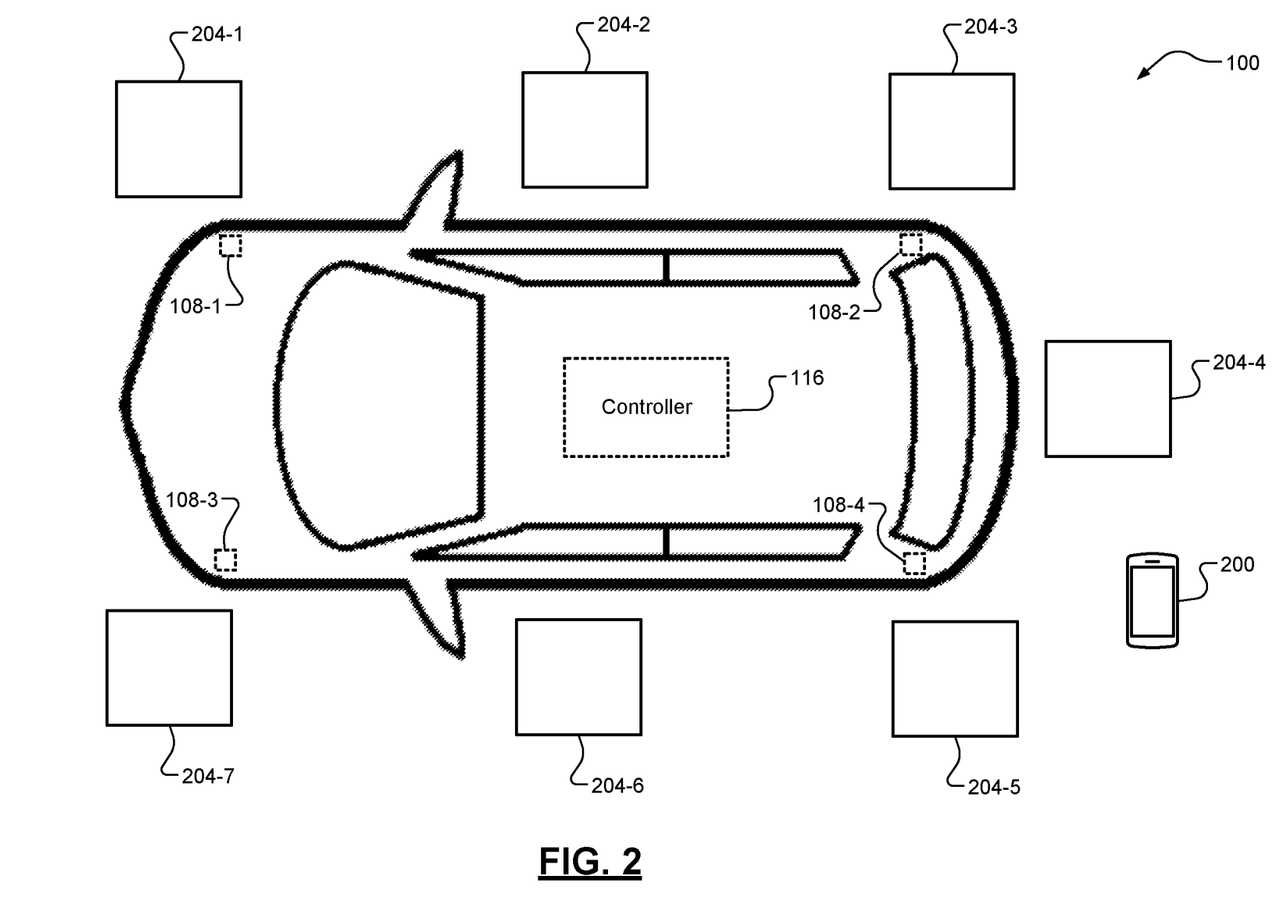
FIG. 2 is an overhead view of an example vehicle gesture recognition procedure for hands-free vehicle access using UWB communication according to some implementations of the present disclosure.

Referring now to FIG. 2, an overhead view of the vehicle 100 and an example vehicle gesture recognition procedure for hands-free vehicle access using UWB communication according to some implementations of the present disclosure is illustrated. In the illustrated example, there are four UWB transceivers 108-1 . . . 108-4 (collectively "UWB transceivers 108") arranged proximate to four corners of the vehicle 100. It will be appreciated that this is merely an example configuration and that any suitable combination of three or more UWB transceivers 108 arranged to provide triangulation-like positioning could be utilized (including, for example, interior cabin located vehicle UWB transceivers, such as in a center dash/console or at the center of rear seat(s)). As shown in FIG. 2, a mobile device 200 is proximate to the vehicle 100. When the mobile device 200 nears the vehicle 100 and is configured for UWB communication (e.g., via its own UWB transceiver), the controller 116 is configured to detect its presence by communicating with the UWB transceivers 108. The controller 116 is also configured to determine whether or not the mobile device 200 is an authorized mobile device. The term "authorized" as used herein refers to the mobile device 200 being associated with an authorized user of the vehicle 100 (e.g., an owner of the vehicle 100) that establishes the mobile device 200 as an authorized electronic key. This could be determined by detecting a key fob on the user that is also in possession of the mobile device 200 or in any other suitable manner, such as the mobile device 200 being logged into an authorized account or service associated with the vehicle 100.

This initial communication between the mobile device 200 and the controller 116 of the vehicle 100 to initially detect and verify authentication of the mobile device 200 could be performed via non-UWB communication mediums. For example, short-range wireless communication mediums such as Bluetooth or WiFi (e.g., WiFi Direct) could be utilized. This could include, for example, the controller 116 polling for a nearby mobile device in order to "wakeup" the vehicle 100, authenticating the mobile device 200 as an authorized electronic key, as well as other approach functions (e.g., activate welcome lights on the vehicle 100). Other longer-range communication mediums could also be utilized for part of this process. For example, a global positioning satellite (GPS) system could be utilized by the controller 116, provided that a sufficient GPS signal is available (e.g., not in a parking garage or similar structure) to determine when the mobile device 200 and the vehicle 100 are within a threshold distance from each other such that the wakeup/authentication procedure through the other communication medium(s) as described above could then be performed.

As shown in FIG. 2, there are a plurality of defined zones 204-1 . . . 204-7 (collectively, "defined zones 204"). While seven defined zones 204 are shown, it will be appreciated that other numbers of defined zones 204 could be utilized. The quantity, shape, and/or size of each defined zone 204 could be predefined/predetermined, such as a default setting for the vehicle 100, or could be user-customizable, such as via a mobile application or website. As shown in FIG. 2, there are three defined zones 204-1 . . . 204-3 and 204-5 . . . 204-7 along each side of the vehicle 100 and one defined zone 204-4 behind a rear of the vehicle 100. Once the mobile device 200 is in proximity to the vehicle 100 and is determined to be authorized, the controller 116 monitors the position of the mobile device 200 relative to the defined zones 204. This is also referred to herein as a "movement routine." The movement routine comprises both which defined zone 204 the mobile device 200 is in along with a time or duration that the mobile device 200 remains in each defined zone 204. While monitoring, when the movement routine of the mobile device 200 matches one of a set of predefined movement routines associated with hands-free vehicle access, the controller 116 would then command a respective actuator 112 to provide hands-free vehicle access.

Similar to the quantity/size/shape of the defined zones 204, the predefined movement routines (zones, durations, etc.) could be either predetermined for the vehicle 100 (e.g., default settings) or could be user-customizable via the mobile device 200 or another computing device, such as through a mobile application or website. In some implementations, the controller 116 could command the actuator 112 or another actuator to output an indication to the user indicative of whether a particular portion of a particular predefined movement routine has been satisfied. This indication could be a visual and/or audible output by a vehicle actuator or in some implementations could be a visual, audible, or haptic output by the mobile device 200. In general, a predefined movement routine would include the mobile device 200 moving between two or more of the defined zones 204 and remaining in each defined zone 204 for a threshold amount of time. The time or duration that the mobile device 200 remains in each defined zone is also referred to herein as a pause or dwell time. There could also be defined timeout periods where the mobile device 200 remains in a particular defined zone 204 for too long and the predefined movement routine would not be satisfied (i.e., monitoring would need to restart from the beginning). For illustrative purposes, an example predefined movement routine for hands-free vehicle access to a trunk or rear tailgate/liftgate of the vehicle 100 will now be described in greater detail.

First, the controller 116 will determine whether the mobile device 200 has moved to a first defined zone 204-3 or 204-5 proximate to the rear of the vehicle 100 but where the user would not obstruct movement of the trunk or rear tailgate/liftgate. Second, the controller 116 will determine whether the mobile device 200 remains in the first defined zone 204-3 or 204-5 for at least a first period ($T_{pause}$). Third, the controller 116 will determine whether the mobile device 200 then moves to a second defined zone 204-4 at the rear of the vehicle 100 and where the user would obstruct movement of the trunk or rear tailgate/liftgate. Fourth, the controller 116 will determine whether the mobile device 200 remaining in the second defined zone 204-4 for at least a second period, which may also be $T_{pause}$. It will be appreciated that different length pause or dwell periods could be utilized for different defined zones 204. Fifth, the controller 116 will determine whether the mobile device 200 then moves back to the first defined zone 204-3 or 204-5 and remains in the first defined zone 204-3 or 204-5 for at least a third period, which may also be $T_{pause}$ or a different length pause or dwell period as described above. When all of the above are satisfied, the controller 116 will determine that the movement routine of the mobile device 200 matches the above-described predefined movement routine and the controller 116 will command a respective actuator 112 to provide hands-free vehicle access to the user.

For further illustrative purposes, an example predefined movement routine for hands-free vehicle access to a driver-side door of the vehicle 100 will now be described in greater detail. First, the controller 116 will determine whether the mobile device 200 has moved to a first defined zone 204-6 proximate to the driver-side door of the vehicle 100. Second, the controller 116 will determine whether the mobile device 200 remains in the first defined zone 204-6 for at least a first period, which could be $T_{pause}$. Third, the controller 116 will determine whether the mobile device 200 then moves to a second defined zone 204-5 at a rear corner of the vehicle 100. Fourth, the controller 116 will determine whether the mobile device 200 remaining in the second defined zone 204-5 for at least a second period, which may also be $T_{pause}$. Fifth, the controller 116 will determine whether the mobile device 200 then moves back to the first defined zone 204-6 and remains in the first defined zone 204-6 for at least a third period, which may also be $T_{pause}$. When all of the above are satisfied, the controller 116 will determine that the movement routine of the mobile device 200 matches the above-described predefined movement routine and the controller 116 will command a respective actuator 112 to provide hands-free vehicle access to the user.

Figure 3:
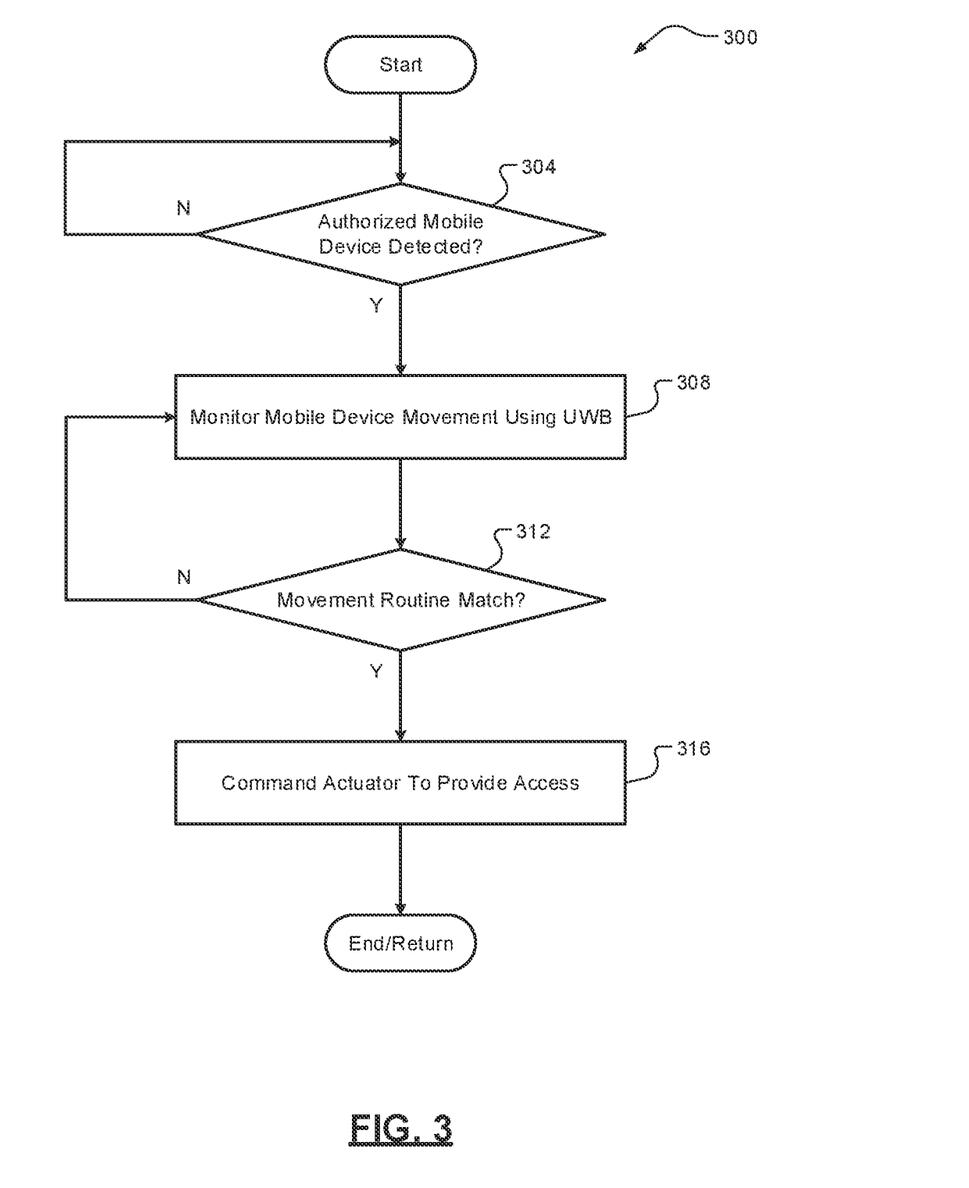
FIG. 3 is a flow diagram of an example gesture recognition method for hands-free vehicle access using UWB communication according to some implementations of the present disclosure.

Referring now to FIG. 3, a flow diagram of an example gesture recognition method 300 for hands-free vehicle access using UWB communication according to some implementations of the present disclosure is illustrated. At 304, the controller 116 determines whether the mobile device 200 is detected and whether it is authorized. When both are true, the method 300 proceeds to 308. Otherwise, the method 300 ends or returns to 304. At 308, the controller 116 monitors the movement of the mobile device 200 using UWB communication. At 312, the controller 116 determined whether the movement routine of the mobile device 200 matches one of a set of predefined movement routines. When true, the method 300 proceeds to 316. When false, the method 300 ends or returns to 308 where movement monitoring of the mobile device 200 continues. At 316, the controller 116 commands a respective actuator 112 to provide hands-free vehicle access to the user and the method 300 ends or returns to 304 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gesture recognition system for hands-free access to a vehicle, the system comprising:
a set of vehicle ultra-wideband (UWB) transceivers comprising at least three UWB transceivers each arranged proximate to at least one of sides and corners of the vehicle; and
a controller in communication with the set of vehicle UWB transceivers and configured to:
detect a presence of a vehicle-authorized mobile device in possession of an authorized user, wherein the mobile device comprises a device UWB transceiver;
determine a plurality of defined zones proximate to the vehicle and associated with the hands-free vehicle access;
communicate between the set of vehicle UWB transceivers and the device UWB transceiver to monitor a location of the mobile device;
monitor a movement routine of the mobile device relative to the plurality of defined zones over a period, the movement routine including (i) the mobile device being present in a first defined zone of the plurality of defined zones for at least a first period followed by (ii) the mobile device being present in a different second defined zone of the plurality of defined zones for at least a second period; and
in response to determining a match between the monitored movement routine and one of a set of predefined movement routines associated with the hands-free vehicle access, command one of a set of access actuators of the vehicle to grant the hands-free vehicle access corresponding to the matched predefined movement routine.

2. The system of claim 1, wherein the predefined movement routines are predetermined for the vehicle.

3. The system of claim 1, wherein the predefined movement routines are customizable by the user via the mobile device or another computing device.

4. The system of claim 3, wherein the user is able to customize at least one of size and shapes of the plurality of defined zones and durations that the mobile device must remain in particular defined zones.

5. The system of claim 1, wherein the controller is further configured to command an output actuator of the vehicle to output an indication to the user indicative of whether a particular portion of a particular predefined movement routine has been satisfied.

6. The system of claim 1, wherein the set of access actuators comprises at least one of a door actuator, a trunk actuator, and a rear tailgate or liftgate actuator.

7. The system of claim 1, wherein a particular one of the set of predefined movement routines for hands-free access to a trunk/tailgate/liftgate of the vehicle comprises:
the mobile device moving to the first defined zone, the first defined zone being proximate to a rear of the vehicle but where the user would not obstruct movement of the trunk/tailgate/liftgate;
the mobile device remaining in the first defined zone for at least the first period;
the mobile device then moving to the second defined zone, the second defined zone being at the rear of the vehicle and where the user would obstruct movement of the trunk/tailgate/liftgate;
the mobile device remaining in the second defined zone for at least the second period; and
the mobile device then moving back to the first defined zone and remaining in the first defined zone for at least a third period.

8. The system of claim 7, wherein the first, second, and third periods are substantially equal and are all less than a timeout period.

9. The system of claim 8, wherein if the mobile device remains in the first or second defined zones for greater than the timeout period, the controller determines that the monitored movement routine of the mobile device does not match the particular one of the set of predefined movement routines.

10. A gesture recognition method for hands-free access to a vehicle, the method comprising:
    detecting, by a controller of the vehicle, a presence of a vehicle-authorized mobile device in possession of an authorized user, wherein the mobile device comprises a device ultra-wideband (UWB) transceiver;
    determining, by the controller, a plurality of defined zones proximate to the vehicle and associated with the hands-free vehicle access;
    communicating, by the controller, between (i) a set of vehicle UWB transceivers of the vehicle comprising at least three UWB transceivers each arranged proximate to at least one of sides and corners of the vehicle and (ii) the device UWB transceiver to monitor a location of the mobile device;
    monitoring, by the controller, a movement routine of the mobile device relative to the plurality of defined zones over a period, the movement routine including (i) the mobile device being present in a first defined zone of the plurality of defined zones for at least a first period followed by (ii) the mobile device being present in a different second defined zone of the plurality of defined zones for at least a second period; and
    in response to determining a match between the monitored movement routine and one of a set of predefined movement routines associated with the hands-free vehicle access, commanding, by the controller, one of a set of access actuators of the vehicle to grant the hands-free vehicle access corresponding to the matched predefined movement routine.

11. The method of claim 10, wherein the predefined movement routines are predetermined for the vehicle.

12. The method of claim 10, wherein the predefined movement routines are customizable by the user via the mobile device or another computing device.

13. The method of claim 12, wherein the user is able to customize at least one of size and shapes of the plurality of defined zones and durations that the mobile device must remain in particular defined zones.

14. The method of claim 10, further comprising commanding, by the controller, an output actuator of the vehicle to output an indication to the user indicative of whether a particular portion of a particular predefined movement routine has been satisfied.

15. The method of claim 10, wherein the set of access actuators comprises at least one of a door actuator, a trunk actuator, and a rear tailgate or liftgate actuator.

16. The method of claim 10, wherein a particular one of the set of predefined movement routines for hands-free access to a trunk/tailgate/liftgate of the vehicle comprises:
    the mobile device moving to the first defined zone, the first defined zone being proximate to a rear of the vehicle but where the user would not obstruct movement of the trunk/tailgate/liftgate;
    the mobile device remaining in the first defined zone for at least the first period;
    the mobile device then moving to the second defined zone, the second defined zone being at the rear of the vehicle and where the user would obstruct movement of the trunk/tailgate/liftgate;
    the mobile device remaining in the second defined zone for at least the second period; and
    the mobile device then moving back to the first defined zone and remaining in the first defined zone for at least a third period.

17. The method of claim 16, wherein the first, second, and third periods are substantially equal and are all less than a timeout period.

18. The method of claim 17, wherein if the mobile device remains in the first or second defined zones for greater than the timeout period, the controller determines that the monitored movement routine of the mobile device does not match the particular one of the set of predefined movement routines.

19. A gesture recognition system for hands-free access to a vehicle, the system comprising:
    a set of vehicle ultra-wideband (UWB) transceiver means comprising at least three UWB transceiver means each arranged proximate to at least one of sides and corners of the vehicle; and
    a controller means for communicating with the set of vehicle UWB transceiver means and for:
        detecting a presence of a vehicle-authorized mobile device means in possession of an authorized user, wherein the mobile device means comprises a device UWB transceiver means;
        determining a plurality of defined zones proximate to the vehicle and associated with the hands-free vehicle access;
        communicating between the set of vehicle UWB transceiver means and the device UWB transceiver means to monitor a location of the mobile device means;
        monitoring a movement routine of the mobile device means relative to the plurality of defined zones over a period, the movement routine including (i) the mobile device means being present in a first defined zone of the plurality of defined zones for at least a first period followed by (ii) the mobile device means being present in a different second defined zone of the plurality of defined zones for at least a second period; and
        in response to determining a match between the monitored movement routine and one of a set of predefined movement routines associated with the hands-free vehicle access, commanding one of a set of access actuator means of the vehicle for granting the hands-free vehicle access corresponding to the matched predefined movement routine.

20. The system of claim 19, wherein a particular one of the set of predefined movement routines for hands-free access to a trunk/tailgate/liftgate of the vehicle comprises:
    the mobile device means moving to the first defined zone, the first defined zone being proximate to a rear of the vehicle but where the user would not obstruct movement of the trunk/tailgate/liftgate;
    the mobile device means remaining in the first defined zone for at least the first period;
    the mobile device means then moving to the second defined zone, the second defined zone being at the rear of the vehicle and where the user would obstruct movement of the trunk/tailgate/liftgate;
    the mobile device means remaining in the second defined zone for at least the second period; and
    the mobile device means then moving back to the first defined zone and remaining in the first defined zone for at least a third period.

* * * * *